(12) United States Patent
Schoenlieb et al.

(10) Patent No.: US 11,525,914 B2
(45) Date of Patent: Dec. 13, 2022

(54) TIME OF FLIGHT SYSTEM AND METHOD INCLUDING SUCCESSIVE REFLECTIONS OF MODULATED LIGHT BY AN OBJECT AND BY AN ADDITIONAL REFLECTIVE SURFACE FOR DETERMINING DISTANCE INFORMATION OF THE OBJECT USING A TIME OF FLIGHT SYSTEM

(71) Applicant: Infineon Technologies AG, Neubiberg (DE)

(72) Inventors: Armin Schoenlieb, Seiersberg-Pirka (AT); David Lugitsch, Graz (AT); Hannes Plank, Graz (AT)

(73) Assignee: Infineon Technologies AG, Neubiberg (DE)

( * ) Notice: Subject to any disclaimer, the term of this patent is extended or adjusted under 35 U.S.C. 154(b) by 353 days.

(21) Appl. No.: 16/914,280

(22) Filed: Jun. 27, 2020

(65) Prior Publication Data
US 2020/0408909 A1    Dec. 31, 2020

(30) Foreign Application Priority Data

Jun. 28, 2019 (EP) .................................... 19183132

(51) Int. Cl.
*G01S 17/88* (2006.01)
*G01S 17/10* (2020.01)
*B60K 37/04* (2006.01)
*G01S 7/481* (2006.01)

(52) U.S. Cl.
CPC .............. *G01S 17/10* (2013.01); *B60K 37/04* (2013.01); *G01S 7/4814* (2013.01); *G01S 17/88* (2013.01); *B60K 2370/1529* (2019.05); *B60K 2370/167* (2019.05)

(58) Field of Classification Search
CPC ........ B60K 37/04; B60K 37/00; B60K 31/00; B60K 2370/00; G01S 17/06; G01S 17/08; G01S 17/10; G01S 17/04; G01S 17/88; G01S 17/93; G01S 7/48
USPC ................................................. 250/221, 216
See application file for complete search history.

(56) References Cited

U.S. PATENT DOCUMENTS

| 2012/0224062 | A1* | 9/2012 | Lacoste | .................... G09G 5/14 348/148 |
| 2016/0146938 | A1 | 5/2016 | Becker et al. | |
| 2018/0247424 | A1 | 8/2018 | Bleyer et al. | |
| 2018/0272978 | A1 | 9/2018 | Raphael et al. | |
| 2019/0018108 | A1 | 1/2019 | Gao et al. | |

* cited by examiner

*Primary Examiner* — Que Tan Le
(74) *Attorney, Agent, or Firm* — Murphy, Bilak & Homiller, PLLC

(57) ABSTRACT

Examples relate to a method for determining distance information of an object using a Time of Flight (ToF) system and to a ToF system. The method includes emitting modulated light towards the object using a light source. The method includes measuring a reflection of the modulated light using a ToF sensor module. The reflection of the modulated light is generated by successive reflections of the modulated light by the object and by an additional reflective surface. The method includes determining the distance information of the object based on the measured reflection of the modulated light.

19 Claims, 3 Drawing Sheets

TIME OF FLIGHT SYSTEM AND METHOD INCLUDING SUCCESSIVE REFLECTIONS OF MODULATED LIGHT BY AN OBJECT AND BY AN ADDITIONAL REFLECTIVE SURFACE FOR DETERMINING DISTANCE INFORMATION OF THE OBJECT USING A TIME OF FLIGHT SYSTEM

TECHNICAL FIELD

Examples relate to a method for determining distance information of an object using a Time of Flight (ToF) system and to a Time of Flight system, more specifically, but not exclusively, to concepts for determining the distance information based on a reflection of modulated light that is generated by successive reflections of the modulated light by the object and by an additional reflective surface.

BACKGROUND

The monitoring of users in certain cases, such as vehicles, using depth-sensing cameras is a field of research and development. In these cases, space-constraints may typically apply, e.g. due to the presence of other devices integrated in the available space, a placement of corresponding camera equipment may be difficult. For example, it might not be possible to place the camera directly in front of the user, as it may occlude the field of view. A visible camera might also cause contempt and might not integrate well into the design of the space.

SUMMARY

There may be a desire for improved placement possibilities of depth-sensing cameras, for instance in a vehicle.

Embodiments provide a method for determining distance information of an object using a ToF system. The method comprises emitting modulated light towards the object using a light source. The method comprises measuring a reflection of the modulated light using a ToF sensor module. The reflection of the modulated light is generated by successive reflections of the modulated light by the object and by an additional reflective surface. The method comprises determining the distance information of the object based on the measured reflection of the modulated light.

Embodiments further provide a ToF system for determining distance information of an object. The ToF system comprises a light source configured to emit modulated light towards the object. The ToF system comprises a ToF sensor module configured to measure a reflection of the modulated light. The ToF system comprises a processing module configured to determine the distance information based on the measured reflection. The measured reflection of the modulated light is generated by successive reflections of the modulated light by the object and by an additional reflective surface.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
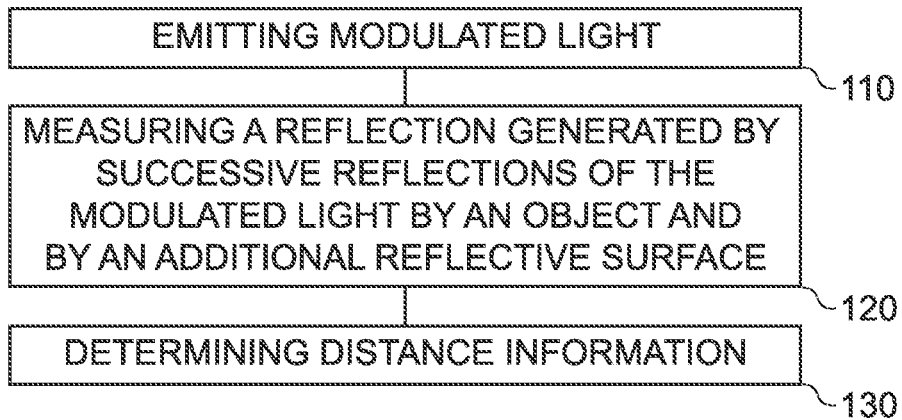
FIGS. 1a and 1b show flow charts of embodiments of a method for determining distance information of an object using a Time of Flight (ToF) system.
Figure 1B:
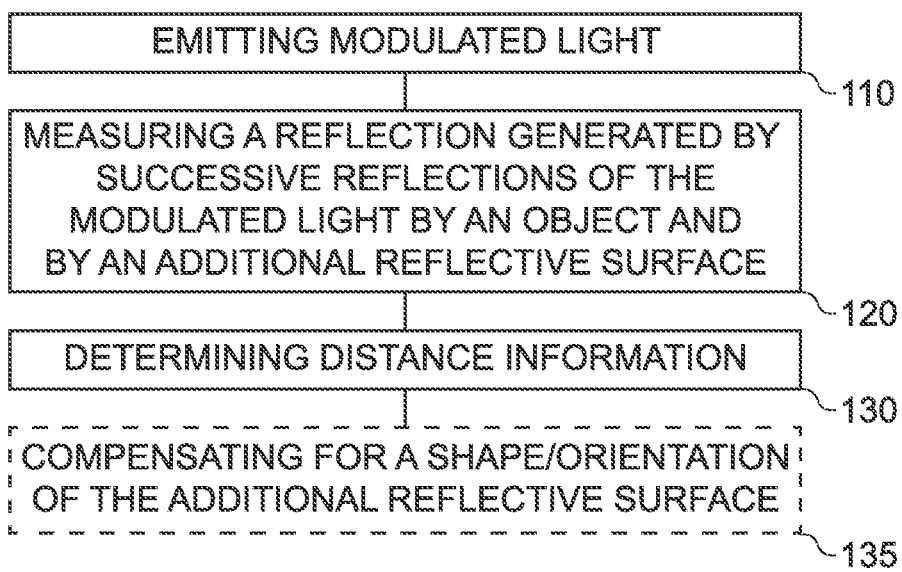

FIGS. 1a and 1b shows flow charts of embodiments of a method for determining distance information of an object 102 using a Time of Flight (ToF) system 10. The method comprises emitting 110 modulated light towards the object using a light source 20. The method comprises measuring 120 a reflection of the modulated light using a ToF sensor module 30. The reflection of the modulated light is generated by successive reflections of the modulated light by the object and by an additional reflective surface 50. The successive reflections form a predetermined and chosen sequence of reflections, whose outcome is to be analyzed.

Indeed, the method further comprises determining 130 the distance information of the object based on the measured reflection of the modulated light. For example, the method may be executed by the ToF system 10.

Figure 1C:
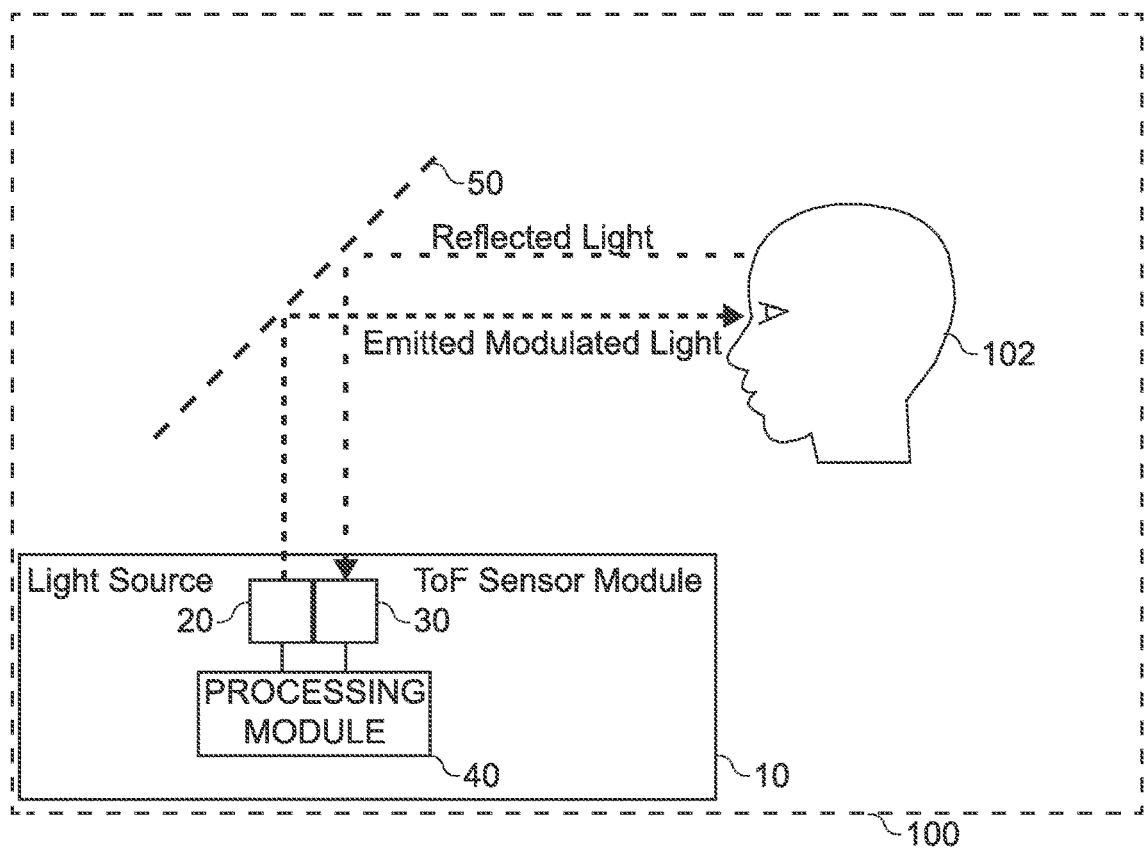
FIG. 1c shows a block diagram of an embodiment of a ToF system for determining distance information of an object.

FIG. 1c shows a block diagram of an embodiment of a corresponding ToF system for determining distance information of an object. The ToF system 10 comprises a light source 20 configured to emit modulated light towards the object. The ToF system 10 comprises a ToF sensor module 30 configured to measure a reflection of the modulated light. The ToF system comprises a processing module 40 configured to determine the distance information based on the measured reflection. The measured reflection of the modulated light is generated by successive reflections of the modulated light by the object and by an additional reflective surface 50. As detailed below, the order in which these reflections occur may vary from one configuration to the other. The processing module 40 is coupled to the light source 20 and to the ToF sensor module 30. For example, the processing module 40 may be configured to execute the method, e.g. in conjunction with the light source 20 and the sensor module 30, e.g. by instructing the respective components to execute the functions. FIG. 1e further shows a vehicle 100 comprising the ToF system 10.

The following description relates both to the method of FIGS. 1a and/or 1b and to the ToF system and/or vehicle of FIG. 1c.

Embodiments are based on the finding that additional reflective surfaces that are present in a vehicle or in other spaces may be willfully used to perform distance measurements between a ToF sensor and an object to be measured. For example, the object may be illuminated using a light source, such as a ToF emitter, e.g. via the additional reflective surface or directly. The light may be reflected successively by the object and by the additional reflective surface, and then measured by the ToF sensor. As the distance of the reflective surface and the distortion caused by the reflective surface is known, they can be compensated in the measurement of the distance, enabling a distance measurement of the object via the additional reflective surface.

Embodiments thus relate to a method and ToF system for determining distance information. In Time of Flight distance measurements, modulated light (e.g. modulated infrared light) may be emitted, reflected by one or more objects, and measured by a Time-of-Flight sensor comprising a photon mixing device imager. Based on a distance of the object reflecting the optical signal, a delay between the emission of the modulated light and the measurement of the reflection of the modulated light by the ToF sensor may vary. A distance of the object to the sensor may be determined based on the delay between the emission of the modulated light and the measurement of reflection of the modulated light. To determine the distance more precisely, a phase of the measured reflection may be measured and compared to the emitted modulated light.

The method comprises emitting 110 the modulated light towards the object using the light source 20. The light source may be controlled by the processing module 40. For example, the modulated light may be continuous wave modulated light, e.g. based on a continuous square wave modulation. Accordingly, the light source 20 may be a continuous wave light source, configured to emit the modulated light as continuous wave modulated light. In at least some embodiments, the modulated light is modulated infrared light. Modulated infrared light is often used in ToF systems for distance measurements. In some embodiments, the ToF sensor module 30 may comprise the light source 20 or may be arranged in close proximity to the light source 20. Alternatively, the ToF sensor module 30 and the light source 20 may be separate. i.e. arranged separately.

In embodiments, the modulated light is emitted towards the object. For example, the modulated light may be emitted directly towards the object. In this scenario, the modulated light may be reflected by the object first and subsequently by the additional reflective surface. The light source may be directed at the object, e.g. may be arranged opposite the object. This may enable a direct illumination of the object. Alternatively, the modulated light may be emitted 110 indirectly towards the object via the additional reflective surface 50. This may lead to more degrees of freedom in the placement of the light source. In this scenario, the modulated light may be reflected by the additional reflective surface first and subsequently by the object. After the light is reflected, it may optionally be reflected by the additional reflective surface for a second time, e.g. if the light source is arranged near the ToF sensor. The light source may be directed at the additional reflective surface.

The method comprises measuring 120 a reflection of the modulated light using a ToF sensor module 30. For example, the reflection of the modulated light may be measured by a ToF sensor (e.g. a PMD imager) of the ToF sensor module 30. In other words, the ToF sensor module may be configured to perform the measurement of the reflection of the modulated light. For example, the measurement of the reflection of the modulated light may comprise an amplitude measurement and/or a phase measurement of the reflection of the modulated light. Alternatively and/or additionally, the measurement of the reflection of the modulated light may comprise distance values of the object. From the perspective of the processing module 40, the measuring 120 of the reflection of the modulated light may comprise obtaining the measurement of the reflection of the modulated light from the ToF sensor module 30. In other words, the processing module 40 may be configured to obtain the measurement of the reflection of the modulated light from the ToF sensor module 30.

The reflection of the modulated light is generated by successive reflections of the modulated light by the object and by the additional reflective surface 50. In this context, the term "successive reflections" may mean that the measured reflection that is used for the determining of the distance of the object has been reflected both by the additional reflective surface and by the object, in a successive manner. For example, a total measurement of the reflected modulated light of the ToF sensor may comprise a portion of the modulated light that has been reflected by the object and a (disjoint) portion of the modulated light that has not been reflected by the object. In the context of this application, the "measured reflection" may be the portion that has been reflected by the object. Additionally, the measured reflection has been reflected by the additional reflective surface, e.g. before and/or after being reflected by the object. In some embodiments, the method may comprise isolating the object within the total measurement of the reflected modulated light of the ToF sensor to obtain the measured reflection.

For example, the modulated light may be reflected by the object before it (i.e. the modulated light) is reflected by the additional reflective surface 50. In such scenarios, the ToF sensor may face the additional reflective surface 50, i.e. the ToF sensor may be directed at the additional reflective surface 50. The light source may also face the additional reflective surface 50, or directly face the object. Additionally or alternatively, the modulated light may be reflected by the object after it is reflected by the additional reflective surface

Figure 2:
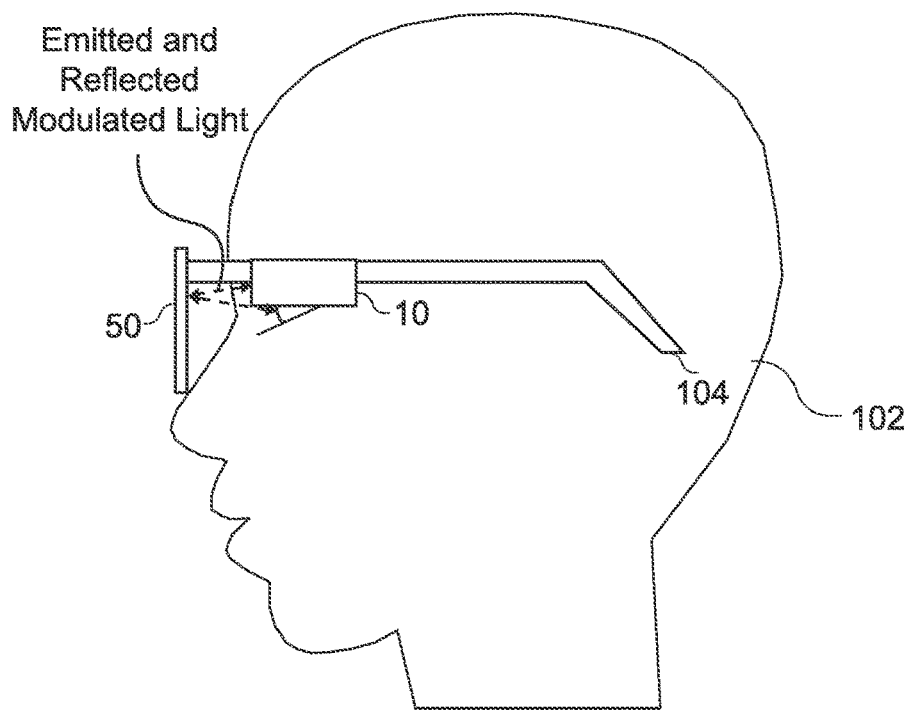
FIG. 2 shows a schematic diagram of an example of a ToF system integrated in a pair of smart glasses.
Figure 3:
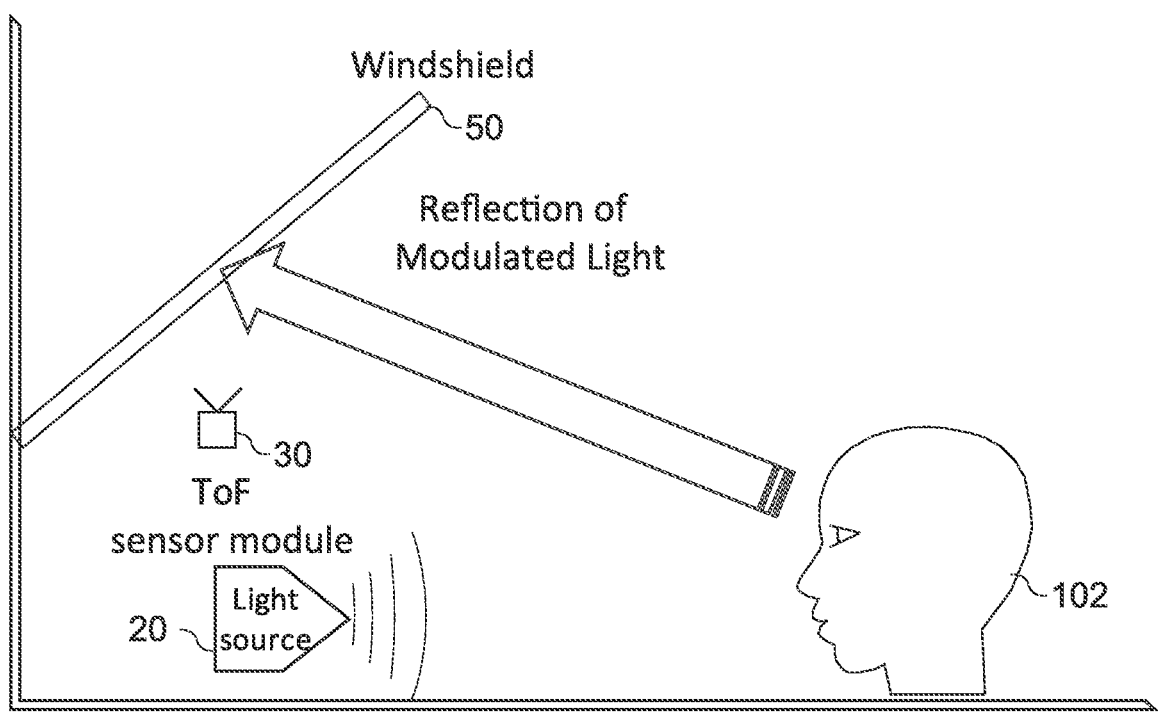
FIG. 3 shows a schematic diagram of an example of a ToF system being used in a vehicle.

50. In such scenarios, the light source may face the additional reflective surface 50, i.e. the light source may be directed at the additional reflective surface 50. The ToF sensor module may also face the additional reflective surface 50, or directly face the object. In effect, the additional reflective surface may redirect the light path of the modulated light or of the reflection of the modulated light. Consequently, there may be at least three scenarios:

As shown in FIG. 3, the modulated light is directly emitted towards the object, reflected by the object before it is reflected by the additional reflective surface and measured by the ToF sensor module via the additional reflective surface, The modulated light is indirectly emitted towards the object via the additional reflective surface, reflected by the additional reflective surface before it is reflected by the object and subsequently measured by the ToF sensor module (without being reflected by the additional reflective surface for a second time), and As shown in FIGS. 1c and 2, the modulated light is indirectly emitted towards the object via the additional reflective surface, reflected by the additional reflective surface before it is reflected by the object, reflected by the additional reflective surface after it is reflected by the object, and measured by the ToF sensor module via the additional reflective surface.

In other words, the reflection of the modulated light by (i.e. at) the additional reflective surface may occur before and/or after the reflection of the modulated light by (i.e. at) the object.

To increase the quality of the measurement of the reflected modulated light, the additional reflective surface may be adjusted to the modulated light. For example, the additional reflective surface may have a high reflectance (e.g. at least 0.5, or at least 0.6, at least 0.7, at least 0.8, at least 0.9) for the modulated light. The reflectance of a surface is defined as the ratio between the radiance (i.e. radiant flux) received by the surface and a radiance reflected by the surface, i.e. a fraction of incident electromagnetic power that is reflected at the surface. The additional reflective surface may act as a mirror towards the modulated light.

In at least some embodiments, the modulated light is modulated infrared light. The additional reflective surface 50 may have a reflectance of at least 0.5 (or at least 0.6, at least 0.7, at least 0.8, at least 0.9) for infrared light. A high reflectance enables an improved determination of the distance information, as most of the incident light is reflected by the additional reflective surface. In some embodiments, the additional reflective surface is a windshield 50 of the vehicle 100. As the windshield is generally transparent, at least a portion of the windshield may comprise a coating that is reflective for infrared light (e.g. towards the inside of the vehicle). In other words, the additional reflective surface 50 may comprise a coating that is reflective for infrared light. For example, if the additional reflective surface is a windshield of the vehicle, the coating may be reflective for infrared light at a surface of the windshield that faces the inside of the vehicle. The coating may be used to improve the reflection of the modulated light and/or of the reflection of the modulated light at the additional reflective surface.

Alternatively, embodiments may be used in a smart glasses context, for instance for eye tracking purposes. In this case, the modulated light may be reflected by the lens (or lenses) of the smart glasses to allow miniaturization. In other words, as shown in FIG. 2, the additional reflective surface 50 may be a lens of a pair of smart glasses 104. For example, the ToF system 10 may be integrated in a sidepiece of the smart glasses 104. Accordingly, embodiments provide smart glasses 104 comprising the ToF system 10.

The method comprises determining 130 the distance information of the object based on the measured reflection of the modulated light. For the most part, the distance information may be determined similar to "conventional" ToF systems. For example, the measured reflection may comprise at least one phase measurement of light incident to the ToF sensor, the light being successively reflected by the object and the additional reflective surface. The distance information may be determined based on the phase measurement. Alternatively, raw (i.e. unprocessed) distance information may be obtained from the ToF sensor module, and the distance information may be determined 130 based on the raw distance information. In this context, the distance information may comprise a distance measurement of the distance between the ToF sensor module measuring the reflection of the modulated light and the object. For example, the distance information may be represented by a distance image, a distance map or by a point cloud. Similar to a "normal" camera sensor, the ToF sensor may provide the measurement of the reflected modulated light using a two-dimensional grid of pixels. Consequently, the distance information, e.g. the distance image or distance map, may be represented using a two-dimensional grid of pixels.

In at least some embodiments, the additional reflective surface may lead to distortions in the determination of the distance information. For example, if the additional reflective surface is uneven or curved, the distance information may be adjusted to compensate for the shape of the additional reflective surface. Additionally, as, in many cases, the additional reflective surface may lead to a redirection of the modulated light (or of the reflection of the modulated light) by approximately 90° (if the incident angle is approximately 45°), the measured reflection might not account for the actual location of the object relative to the ToF sensor module, but may account for a distance that is influenced by the redirection of the modulated light that occurs at the additional reflective surface. In many scenarios, this might not matter or might be accounted for by design, for example if merely an object is being monitored and no accurate 3D point cloud representation of a scenario is required. In some other scenarios, e.g. in scenarios in which embodiments are used to determine the distance information in locations where no sensor can be placed (e.g. due to heat, humidity or space constraints), an accurate 3D point cloud representation of the scenario may be used. Accordingly, determining 130 the distance information may include compensating 135 for a shape and/or orientation of the additional reflective surface 50. This may enable using additional reflective surfaces that have a non-even shape or non-ideal orientation, such as a windshield of the vehicle.

The compensation of the shape and/or orientation may comprise at least one of two components: additional optics and additional processing. For example, the shape and/or orientation of the additional reflective surface 50 may at least partially be compensated for using one or more additional optical elements (such as one or more lenses, prisms, filters, windows, mirrors etc.). This may enable a more precise distance measurement and/or a distance measurement with less processing requirements. For example, the one or more additional optical elements may be in addition to a (single) lens that is part of the ToF sensor module, e.g. a lens that is directly adjacent to the ToF sensor. The one or more additional optical elements may be arranged between the object and the ToF sensor module and/or between the additional reflective surface and the ToF sensor module.

Alternatively or additionally, the one or more additional optical elements may be arranged between the light source and the object module and/or between the light source and the additional reflective surface. The one or more additional optical elements may be suitable for (or configured to/arranged to) at least partially compensating for a shape and/or orientation of the additional reflective surface.

Additionally or alternatively, the shape and/or orientation of the additional reflective surface 50 may be at least partially compensated for in a processing of the measured reflection of the modulated light. By compensating for the distortion caused by the shape and/or orientation of the additional reflective surface 50 in a processing step, the system may be universally adaptable to many scenarios. For example, an inverse distortion model or an inverse distortion function may be applied to the distance information to at least partially compensate for the shape and/or orientation of the additional reflective surface. The inverse distortion model or an inverse distortion function may be determined by determining distance information for a reference (i.e. known) object without compensating for the shape and/or orientation of the additional reflective surface, determining a difference between reference distance information of the reference object and the determined distance information, and determining the inverse distortion model or an inverse distortion function such that, if the inverse distortion model or an inverse distortion function are applied to the determining distance information, the reference distance information is obtained (e.g. or distance information with a difference to the reference distance information that is smaller than a threshold). This can be repeated for multiple objects and/or multiple positions of objects until a desired compensation of the distortion caused by the shape and/or orientation of the additional reflective surface is reached. In some embodiments, in addition to distortion compensation, stationary features of an environment of the object may be removed, e.g. in the same compensation step or using the same model/function.

As laid out in the early sections of the present disclosure, embodiments may be used in vehicular environments. For example, embodiments may be used for monitoring a driver (or another occupant of the vehicle), e.g. to enable attention detection in semi-autonomous driving scenarios, or to enable gesture input.

In a vehicle, one reflective surface that can be used in conjunction with embodiments is the windshield. The windshield may be placed opposite driver and co-driver, such that reflections at the windshield can be used to monitor the driver and co-driver respectively. As the occupant may be captured from the front (via the windshield), every area of the face may be captured with equal fidelity. In other words, the additional reflective surface 50 may be a windshield 50 of the vehicle 100. The windshield of the vehicle may be used as additional reflective surface to obtain more degrees of freedom in the placement of the light source and/or the ToF sensor. Furthermore, as vehicles generally have a windshield, a re-use of the existing surface enables a usage of the ToF system in many vehicles without requiring major redesigns of the vehicle interior.

If the windshield is used as additional reflective surface, the ToF sensor module and/or the light source may be placed on top of the dashboard, e.g. at the driver side of the vehicle or at the co-driver side of the vehicle. In other words, the light source 20 may be arranged above a dashboard of the vehicle 100, facing the additional reflective surface 50. Additionally or alternatively, the ToF sensor module 30 may be arranged above the dashboard of the vehicle 100, facing the additional reflective surface 50. By placing the ToF sensor and/or the light source above the dashboard, it may be "hidden" from the dashboard, enabling a usage of the dashboard for instruments of the vehicle. As written before, the windshield may comprise a coating that is reflective towards a certain range of frequencies, such as infrared right.

Alternatively, the light source 20 and/or the ToF sensor may be embedded within the dashboard of the vehicle 100, e.g. at the driver-side of the vehicle. This may enable a direct illumination of the object, and therefore an improved brightness at lower energy levels. For example, the light source 20 and/or the ToF sensor may be embedded in between the instruments within the dashboard of the vehicle 100. Alternatively, the ToF sensor and/or the ToF light source may be arranged opposite or underneath the instruments of the dashboard, and a reflective surface that is embedded in the dashboard, e.g. such as a transparent cover in front of the instruments of the dashboard may be used as additional reflective surface (e.g. by using an infrared-reflective coating on the transparent cover and/or using instruments that do not emit infrared radiation (at least at a desired wavelength)).

In at least some embodiments, embodiments may be used to monitor occupants of the vehicle. In other words, the object may be an occupant of a vehicle 100. The method may comprise monitoring the occupant of the vehicle 100 based on the determined distance information. For example, the occupant of the vehicle may be monitored to perform a gesture recognition of one or more gestures of the vehicle. Additionally or alternatively, the occupant may be a driver of the vehicle and the vehicle may be a semi-autonomous vehicle, and the driver of the vehicle may be monitored to determine an attentiveness of the driver, e.g. to ensure that the driver is able to take over the driving in case of exceptional situations.

Embodiments may provide car interior driver monitoring, with ToF imagers, by sensing the front of the driver by placing the ToF camera below the dashboard and using the windscreen as mirror.

More details and aspects of examples are mentioned in connection with the proposed concept or one or more examples described above. The examples may comprise one or more additional optional features corresponding to one or more aspects of the proposed concept or one or more examples described above or below.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider" "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for determining distance information of an object using a Time of Flight (ToF) system, the method comprising:
    emitting modulated light towards the object using a light source;
    measuring a reflection of the modulated light using a ToF sensor module, wherein the reflection of the modulated light is generated by successive reflections of the modulated light by the object and by an additional reflective surface; and
    determining the distance information of the object based on the measured reflection of the modulated light.

2. The method of claim 1, wherein the additional reflective surface is a windshield of a vehicle.

3. The method of claim 1, wherein the modulated light is modulated infrared light.

4. The method of claim 1, wherein the additional reflective surface comprises a coating that is reflective for infrared light.

5. The method of claim 1, wherein the additional reflective surface has a reflectance of at least 0.5 for infrared light.

6. The method of claim 1, wherein the modulated light is reflected by the object after being reflected by the additional reflective surface.

7. The method of claim 1, wherein the modulated light is reflected by the object before being reflected by the additional reflective surface.

8. The method of claim 1, wherein the modulated light is emitted indirectly towards the object via the additional reflective surface.

9. The method of claim 1, wherein the modulated light is emitted directly towards the object.

10. The method of claim 1, wherein determining the distance information comprises compensating for a shape and/or orientation of the additional reflective surface.

11. The method of claim 10, wherein the shape and/or orientation of the additional reflective surface is at least partially compensated for in a processing of the measured reflection of the modulated light.

12. The method of claim 10, wherein the shape and/or orientation of the additional reflective surface is at least partially compensated for using one or more additional optical elements.

13. The method of claim 1, wherein the object is an occupant of a vehicle, the method further comprising monitoring the occupant of the vehicle based on the determined distance information.

14. A Time of Flight (ToF) system for determining distance information of an object, the ToF system comprising:
    a light source configured to emit modulated light towards the object;
    a ToF sensor module configured to measure a reflection of the modulated light; and
    a processing module configured to determine the distance information based on the measured reflection, wherein the measured reflection of the modulated light is generated by successive reflections of the modulated light by the object and by an additional reflective surface.

15. A vehicle comprising the ToF system of claim 14.

16. The vehicle of claim 15, wherein the additional reflective surface is a windshield of the vehicle.

17. The vehicle of claim 15, wherein the light source is arranged above a dashboard of the vehicle, facing the additional reflective surface.

18. The vehicle of claim 15, wherein the light source is embedded within a dashboard of the vehicle.

19. The vehicle of claim 15, wherein the ToF sensor module is arranged above a dashboard of the vehicle, facing the additional reflective surface.

* * * * *